(12) United States Patent
Lockett et al.

(10) Patent No.: US 10,086,534 B2
(45) Date of Patent: Oct. 2, 2018

(54) MULTIFUNCTIONAL MANDREL END CAP AND METHOD

(71) Applicant: The Boeing Company, Chicago, IL (US)

(72) Inventors: Peter J. Lockett, Thornbury (AU); Manning J. Scarfe, Ascot Vale (AU)

(73) Assignee: The Boeing Company, Chicago, IL (US)

( * ) Notice: Subject to any disclaimer, the term of this patent is extended or adjusted under 35 U.S.C. 154(b) by 979 days.

(21) Appl. No.: 14/517,029

(22) Filed: Oct. 17, 2014

(65) Prior Publication Data

US 2016/0107338 A1    Apr. 21, 2016

(51) Int. Cl.
| | | |
|---|---|---|
| *B29C 33/00* | (2006.01) | |
| *B29C 70/48* | (2006.01) | |
| *B29C 70/54* | (2006.01) | |

(52) U.S. Cl.
CPC .......... *B29C 33/0038* (2013.01); *B29C 70/48* (2013.01); *B29C 70/54* (2013.01)

(58) Field of Classification Search
None
See application file for complete search history.

(56) References Cited

U.S. PATENT DOCUMENTS

| | | |
|---|---|---|
| 1,573,386 A | 2/1926 | Field |
| 3,962,393 A | 6/1976 | Blad |
| 4,923,541 A | 5/1990 | Burger |
| 5,972,264 A * | 10/1999 | Malekmadani ......... B04B 7/085 264/102 |
| 6,406,580 B1 | 6/2002 | Campbell, Jr. |
| 7,334,782 B2 | 2/2008 | Woods et al. |
| 8,430,984 B2 | 4/2013 | Lee et al. |
| 8,628,717 B2 | 1/2014 | Pook et al. |
| 8,636,252 B2 | 1/2014 | Pook et al. |
| 2005/0073076 A1 | 4/2005 | Woods et al. |
| 2010/0186899 A1 | 7/2010 | Jackson |

FOREIGN PATENT DOCUMENTS

WO    2011055524 A1    5/2011

OTHER PUBLICATIONS

Great Britain Search Report No. 1518326.2 reported on Apr. 5, 2016.

* cited by examiner

*Primary Examiner* — Monica A Huson
(74) *Attorney, Agent, or Firm* — Miller, Matthias & Hull LLP

(57) ABSTRACT

A multifunctional mandrel end cap for the fabrication of composite parts having an end cap core operatively connected to a mandrel and substantially sealed using a bonding agent or end cap sheath. The end cap sheath substantially encloses the end cap core and seals engage perimeter sealing features of the end cap core. The end cap core has a passageway fluidly connecting the mandrel with a vacuum source. The vacuum source is engageable by a vacuum conduit having one or more vacuum conduit perimeter sealing features.

20 Claims, 6 Drawing Sheets

MULTIFUNCTIONAL MANDREL END CAP AND METHOD

BACKGROUND

1) Field of the Disclosure

The disclosure relates generally to a multifunctional mandrel end cap, and more specifically an apparatus and method for the manufacture of composite parts using liquid resin processing methods, such as resin infusion or resin transfer molding, using one or more multifunctional mandrel end cap(s).

2) Description of Related Art

Composite materials have demonstrated advantages in applications where superior strength to weight characteristics may improve performance of a particular application such as aerospace, automotive, trucking, rail, and/or defense applications, for example.

Commonly, composite structures are fabricated through lamination processes that require stacking of unidirectional or woven fabric, preimpregnated "plies." A preimpregnated material, or "prepreg," typically refers to a single layer of fabric material impregnated with a resin matrix. Prepregs are often required to be stored at temperatures below the freezing point of water to minimize the rate of reaction of the matrix components. Prepreg plies are typically oriented in a lamination such that the resulting properties are maximized. A composite part fabricated from a prepreg and lamination processes typically must be cured in an autoclave at a pressure of approximately 85 pounds per square inch and temperatures of 250° F. to 350° F.

Liquid resin processing methods have been developed to address some of the limitations of prepreg part manufacturing—namely the high pressures required to consolidate laminates. Consolidation generally refers to the degree to which the manufactured part is free of voids. Voids are also commonly referred to as porosity. One example of liquid resin processing methods, Controlled Atmospheric Pressure Resin Infusion, or CAPRI, is a method for introducing a liquid resin into a preformed fabric (unidirectional or woven fabric) layup under a vacuum bag and atmospheric pressures. CAPRI and other liquid resin infusion processes enable a high degree of integration of structural composite members. For example, complex stiffening members can be incorporated into a skin laminate to manufacture large, high performance structures in a single curing cycle without the need for autoclave cure pressures. Integration of structural members would otherwise be achieved in traditional prepreg structures through co-curing in an autoclave or secondary joining after each structural member is individually cured. Secondary joining methods include fastening or adhesive bonding.

Application of liquid resin infusion processing may require that liquid resin is isolated from the mandrel to ensure resin does not impregnate the mandrel. A mandrel may be fabricated from a solid or semi-permeable material or may be hollow such as a traditional elastomeric hat stiffener mandrel. Sealing of the mandrel is particularly important if the mandrel is fabricated from a porous or semi-porous material system where ingression of liquid resin and cure of the part may result in permanent alteration of the mandrel such that the mandrel cannot be removed or may not be reused, for example. Current methods for preventing resin ingression into the mandrel during infusion may include: coating with a water-soluble sealant, shrink tapes, or release bagging systems. Existing sealing methods may be time consuming or have high failure rates. Further, existing sealing methods do not eliminate low molecular weight volatiles from evolving from the mandrel and migrating into the composite part during cure.

Additionally, selection of a mandrel material may result in the need for isolating the mandrel from fluid and physical contact with the composite fabric to ensure that low molecular weight compounds are not trapped in the composite part during cure. For example, water vapor may evolve from a mandrel during the composite cure cycle. Water vapor present during the curing cycle of a composite part may result in increased porosity in the final composite part. Low molecular weight vapor compounds may be subsequently trapped in the composite matrix when the resin matrix solidifies during cure. For example, typical epoxy based matrix resin systems transition from a liquid state to a glassy state at the material's glass transition temperature, $T_g$. Further heating of the material results in further hardening due to an increased cross-link density of polymer chains that make up the matrix resin. Vapors present in the laminate after the glass transition phase may be trapped in the part and become porosity.

Further, existing mandrel apparatus do not enable trimming of the mandrel and/or preform fabric to net-dimensions prior to infusion and cure of the part. The ability to trim prior to infusion allows for fabrication to net-dimension, eliminating the need for a later trim procedure, reduces material waste, and reduces infusion time. Net-dimension refers to the final desired dimension of the composite part in at least one direction.

In view of the foregoing, there is a need in the art to overcome the disadvantages of conventional mandrels for use in liquid resin infusion applications. Heretofore, there is a need to seal mandrels from liquid resin pathways to maintain the mandrel's ability to be removed and reused. Further, there is a need to remove volatiles created from heating mandrels during composite curing to prevent the formation of porosity in the part. Still further, there is a need to trim the composite preform to net dimensions prior to infusion.

SUMMARY

The disclosure relates generally to a multifunctional mandrel end cap, and more specifically to an apparatus and method for the manufacture of composite parts using liquid resin processing methods, such as resin infusion or resin transfer molding, using one or more multifunctional mandrel end cap(s).

According to one aspect of the disclosure, a mandrel end cap includes an end cap core encased in a bonding agent, such as an epoxy adhesive, such that the bonding agent adheres to a non-permeable wrap material and substantially seals the mandrel from the external environment. Additionally, a passageway connects the two ends of the end cap core and may be adapted to receive a vacuum source via a vacuum conduit, such as a vacuum tube. In this embodiment one or more end cap cores may be connected to a mandrel, the end cap core or cores may be encased in a bonding agent, and subsequently the mandrel and end cap core or cores may be substantially wrapped in a non-permeable membrane.

According to another aspect, a mandrel end cap consists of an end cap core and an end cap sheath. One end of the end cap core is connected to the mandrel. The end cap core having a passageway connecting the two ends of the end cap core. The passageway being adapted to receive a vacuum source via a vacuum conduit, such as a vacuum tube. In some of the embodiments the end cap core may include one or more circumferential sealing features adapted to receive a sealing means such as an O-ring or elastomeric sealant. Further the end cap sheath is configured to substantially enclose the end cap core such that a seal is created between the end cap core and the end cap sheath. To seal the mandrel, one or more end cap cores are connected to the mandrel and the assembly is substantially wrapped in a non-permeable material. Sheathing the end cap core or cores substantially seals the mandrel from the external environment.

In yet another embodiment, the assembly may be trimmed to net dimension, or final, dimensions, along a net-dimension trim line subsequent to sealing of mandrel through either a bonded or sheathed end cap. For the sheathed end cap embodiment the sealing means must be disposed inside of the cut line, such that one or more circumferential sealing means is not removed from the assembly during trim.

One advantage of the mandrel end cap is that the non-permeable film is substantially sealed to the mandrel such that liquid resin is substantially prohibited from contacting the mandrel. Accordingly, sealing the mandrel ensures that the mandrel can be efficiently removed after cure of the composite part. Further, this embodiment and others allows for the apparatus to maintain seal after the part is trimmed to a net-dimension trim line. Additionally, the apparatus allows for a net-dimension finish without marking or imprinting the final part.

In each embodiment a vacuum conduit may be inserted through a passageway disposed within the end cap core and may make fluid contact with the mandrel. Applying a vacuum to the mandrel this way creates a pressure differential within the mandrel such that volatile gaseous substances generated during heating are removed from the mandrel system through the vacuum source.

An additional advantage of the mandrel end cap is that volatile compounds generated from the mandrel during heating and curing of the composite part are efficiently removed through the vacuum conduit and vacuum source applied to the mandrel. Removal of gaseous volatiles improves the composite part quality by minimizing entrapment of such gases in the composite laminate, which may form of porosity when trapped in the part. Porosity generally reduces mechanical properties of a composite part and may result in rework or scrapping of the part. The mandrel end caps substantially reduce or eliminate the existence of porosity due to volatiles evolved from the mandrel material during cure.

According to another embodiment, a method is provided of fabricating resin infused composites parts. The method comprises operatively connecting at least one end cap core with a mandrel, encasing the mandrel and end cap core with a non-permeable film, applying a bonding agent to the non-permeable film or sheathing the mandrel assembly with an end cap sheath, preforming a composite feature on the mandrel assembly, trimming the preform and assembly along a net-dimension trim line, and infusing and curing the component part.

Other aspects, features, and advantages of the present disclosure will become apparent to those skilled in the art from a consideration of the following detailed description taken in conjunction with the accompanying drawings

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Embodiments are described herein with reference to the accompanying drawings, in which some, but not all of the disclosed embodiments are shown. Several different embodiments may be provided and should not be construed as limited to the embodiments set forth herein. Rather, these embodiments are provided so that this disclosure will be thorough and will fully convey the scope of the disclosure to those skilled in the art.

Figure 1A:
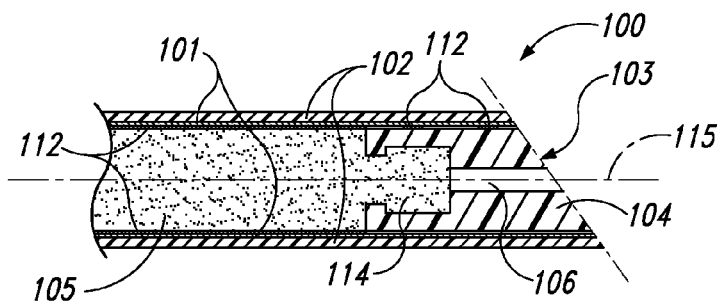
FIG. 1A illustrates a sectional view of a mandrel assembly according to the present disclosure.
Figure 2A:
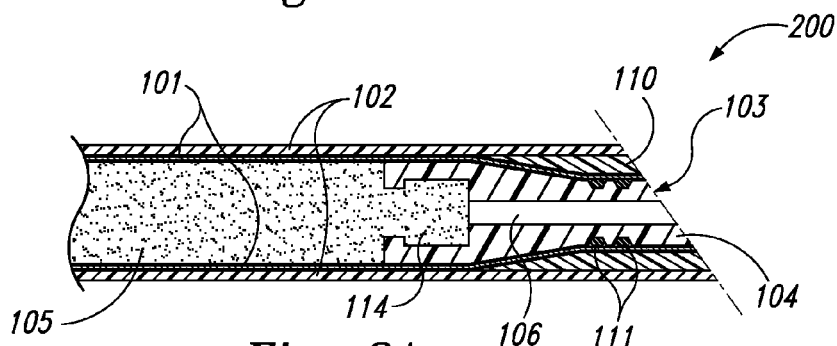
FIG. 2A illustrates a sectional view of a mandrel assembly according to the present disclosure.

According to embodiments shown in FIGS. 1A and 2A, one or more end caps 100 include end cap cores 104 operatively connected to a mandrel 105 disposed along a mandrel axis 115. In some exemplary embodiments, the end cap core 104 is physically attached to or directly molded onto an end 114 of the mandrel 105. The mandrel 105 may include a keyed attachment point such that the mandrel mechanically attaches to the end cap core 104. In each embodiment, the end cap 100 covers the mandrel end 114 and extends outwardly from the mandrel end 114 along the mandrel axis 115. While the mandrel axis 115 appears linear in FIG. 1A, it will be appreciated that the mandrel axis 115 may have an arcuate, irregular, or other configuration.

In the embodiment illustrated at FIG. 1A, both the mandrel 105 and end cap core 104 are wrapped in a non-permeable film 101 which may be, for example, in tubular or film form. In a particular implementation, a tubular film may be shrink-fitted by applying a heat source to tightly wrap, or encase, the mandrel 105 and end cap core 104. In some embodiments, the film is held in place using a bonding agent 112 such has an epoxy film adhesive, paste adhesive, high tack compound or other similar adhesive. The bonding agent 112 may be applied to the entire surface to be joined with the film 101, or may be applied selectively such that it maintains the position of the non-permeable film material 101. In other implementations, the film material 101 is sealed to the end cap core 104 by a seal, such as a rubber O-ring, or any other known mechanical sealing method or structure.

The non-permeable film 101 substantially prevents liquid resin ingression into the mandrel 105. Additionally, the non-permeable film 101 will act as a parting film between the mandrel 105 and the infused preform 102. As such, irregularities in the non-permeable film 101 will transfer to the cured composite part 509 (illustrated in FIG. 5) as, for example, wrinkles, dimples, grooves or gouges. Additionally, the non-permeable film 101 may bridge across features of the mandrel 105 with sufficiently small radius or complex contour variations in the part being fabricated. The mandrel 105 may be encased in the non-permeable film 101 to minimize or eliminate these irregularities. When sealed, the mandrel assembly 400, shown in FIG. 4, will be substantially sealed but for the passageway 106 disposed in the end cap core 104, which may fluidly connect the mandrel 105 to a vacuum source 108.

Figure 4:
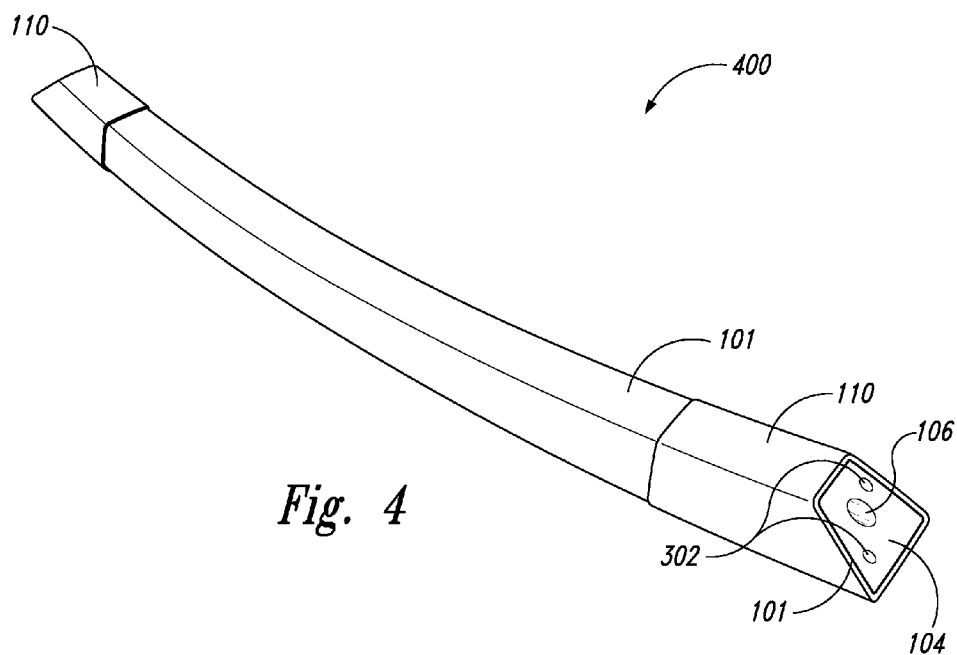
FIG. 4 illustrates a mandrel assembly according to the present disclosure.

In further embodiments, a net-dimension trim line 103 is disposed on the end cap core 104 such that the end cap core 104, non-permeable film 101, and preform 102 are trimmed using a trimming method such as a saw, knife, or ultrasonic cutting method, while mandrel assembly 400, also shown in FIG. 4, remains substantially sealed after trimming.

Figure 2B:
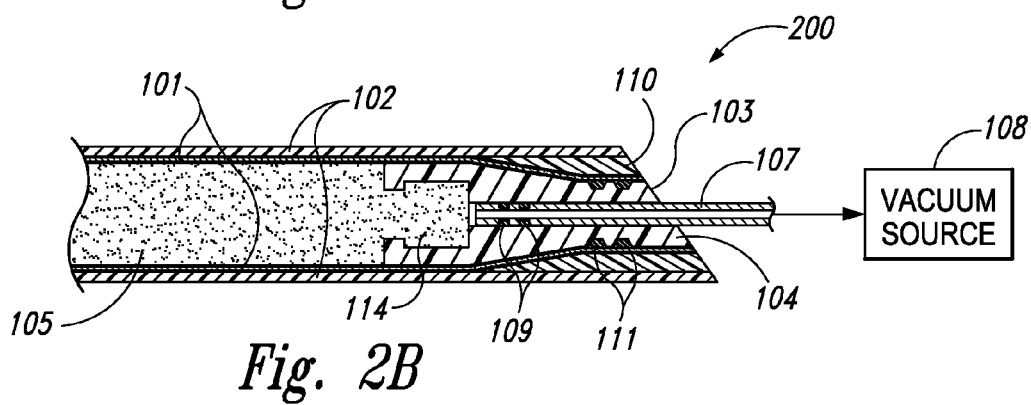
FIG. 2B illustrates a cross sectional view of a mandrel assembly according to the present disclosure.

With reference to FIG. 2A and FIG. 2B, in a particular implementation additional embodiments of a mandrel end cap 200 include an end cap sheath 110. The end cap sheath 110 is configured to substantially enclose the end cap core 104. Further, in some embodiments the end cap core 104 includes one or more perimeter sealing features 111. Perimeter sealing feature(s) 111 may be a groove or recess configured to receive a sealing feature such as an O-ring or elastomeric sealant, for example. When the end cap core 104 and perimeter sealing features 111 are encased in a non-permeable film 101 and sheathed with the end cap sheath 110, the mandrel 105 is substantially sealed to prevent ingression of the liquid resin. When sealed, the mandrel assembly 400, shown in FIG. 4, will be substantially sealed but for the passageway 106 disposed in the end cap core 104 which fluidly connects the mandrel 105 to a vacuum source 108.

In some embodiments, the end cap 200 also has a net-dimension trim line 103 disposed on the end cap core 104 or end cap sheath 110 such that the end cap core 104 or end cap sheath 110, non-permeable film 101, and preform 102 may be trimmed using a trimming method such as a saw, knife, or ultrasonic cutting method, while the mandrel assembly 400, shown in FIG. 5B, remains substantially sealed after trimming.

Figure 1B:
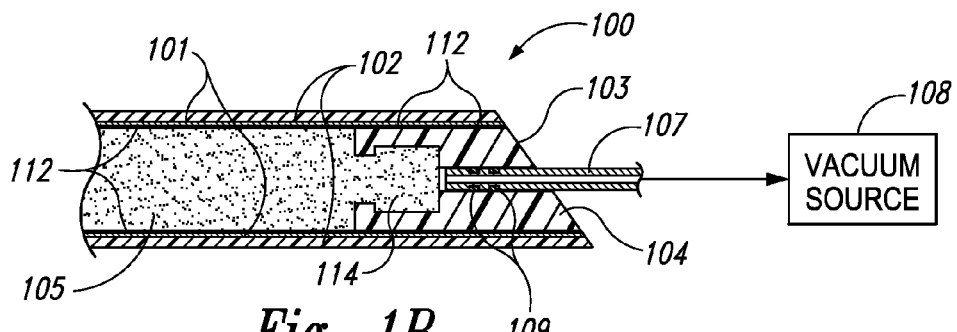
FIG. 1B illustrates a sectional view of a mandrel assembly according to the present disclosure.

Referring to FIGS. 1B, 2B and 4, a vacuum conduit 107 has one or more vacuum conduit perimeter sealing feature(s) 109 such that the when inserted into the passageway 106 of the end cap core 104, the mandrel assembly 400 (shown in FIG. 4) is substantially sealed, and a vacuum source 108 may be applied to the mandrel assembly 400.

Figure 3:
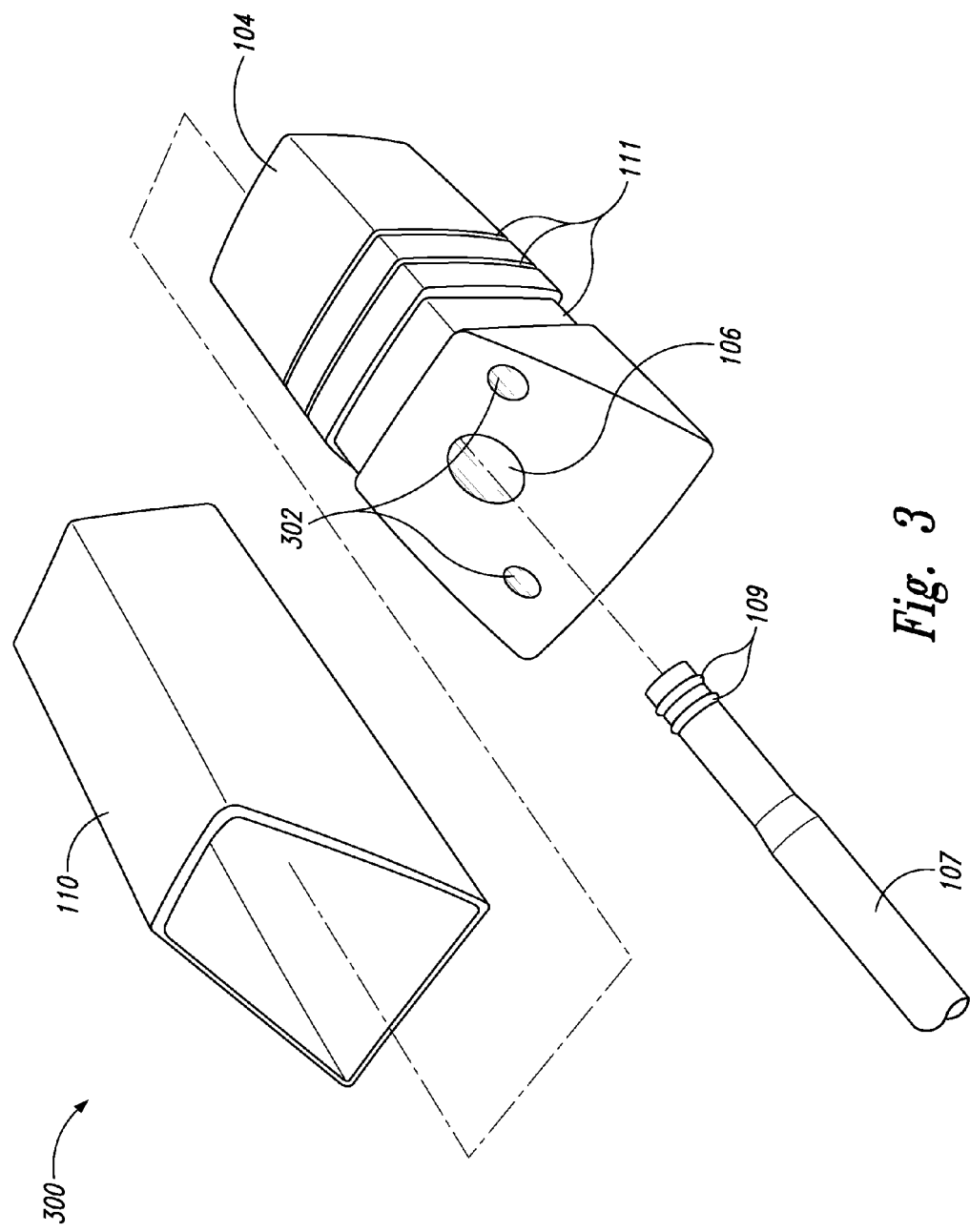
FIG. 3 illustrates an end cap assembly according to the present disclosure.

FIG. 3 further illustrates sealing of the end cap sheath 110. The end cap core 104 having one or more perimeter sealing features 111 seals the mandrel 105 (not shown) by sheathing the end cap core 104 with the end cap sheath 110 to form an end cap 300. A vacuum conduit 107 may be inserted into the end cap core 104 passageway 106 to evacuate the mandrel assembly 400.

Further, according to the embodiment of FIG. 3, the end cap core 104 has one or more trim-guide attachment points 302, such that a trim guide tool may be attached to the end cap core 104 to aid in accurate trimming of the mandrel assembly 300 along a net-dimension trim line 103. The attached trim guide tool creates an opening to allow for a blade or similar trimming device to accurately separate the mandrel assembly 300 along a net-dimension trim line 103 by cutting or slicing through the assembly, for example.

Figure 5:
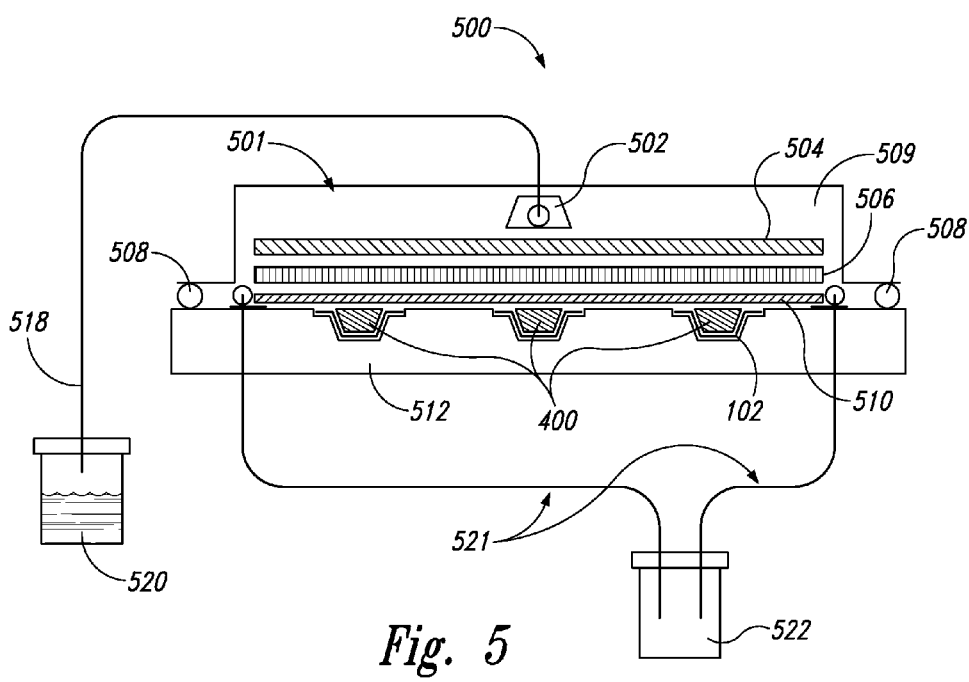
FIG. 5 illustrates a part fabrication system using a mandrel assembly of the present disclosure.

In the embodiment illustrated at FIG. 5, one or more mandrel assembly 400 and preform 102 are placed in a part tool 512 and overlaid with component layup 510, caul 506, and resin distribution media 504. In some implementations, the part tool 512 is configured to accurately receive the mandrel assembly 400 and preform 102. For example, in the illustrated embodiment, the mandrel assembly 400, with preform 102, is placed in the part tool 512 such that it will accurately form a hat stringer and inner mold line of a composite part upon resin infusion and cure of the composite part 509. The composite part 509 is the result of the cure of the preform 102 and the component layup 510. Sealant 508, typically an elastomeric sealant, along the perimeter of the part tool 512 and bagging film 501 seals the part layup assembly 500.

The embodiment of FIG. 5 further illustrates a resin source pot 520 to supply liquid resin to the part layup assembly 500. Resin is transported to the resin inlet port 502 through an inlet line 518. Resin is then distributed throughout the component layup 510 and the stringer preform 102 through resin distribution media 504 and a caul 506. Excess infusion resin is transported through outlet line or lines 521 to an excess resin pot 522.

Figure 6:
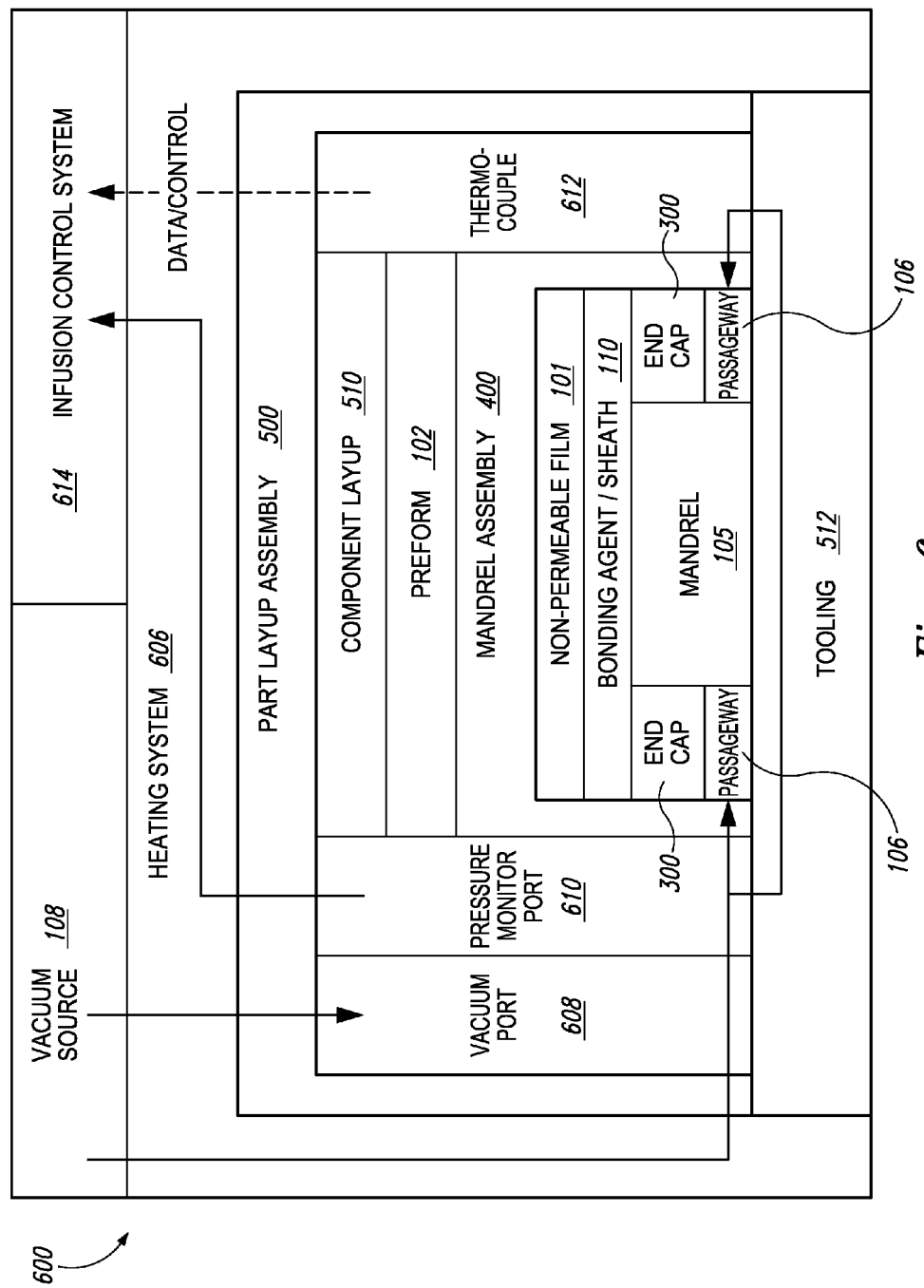
FIG. 6 illustrates a block diagram of a part fabrication system using a mandrel assembly of the present disclosure.

Turning the embodiment illustrated at FIG. 6, a part fabrication system 600 includes a mandrel assembly 400 consisting of the mandrel 105 and one or more end cap(s) 300, which includes either a bonding agent 112 or an end cap sheath 110 with one or more perimeter sealing features 111. The mandrel and end cap(s) are substantially wrapped in a non-permeable film 101 to make up the mandrel assembly 400. One or more preform 102 and mandrel assembly 400 are placed in the part tool 512, where each preform 102 and mandrel assembly 400 may form a structural feature of the part 509. In some embodiments a component layup 510 is laid up on the mandrel assembly 400. The component layup 510 may be a carbon or fiberglass woven or unidirectional fabric material, for example. The part 509 is bagged in a bagging film 501 to create a part layup assembly 500, and the part layup assembly 500 includes vacuum ports 608 which may be connected to a vacuum source 108. Additionally, in some embodiments the part layup assembly 500 includes pressure monitor ports 610 and thermocouples 612 for temperature monitoring. Pressure monitor ports 610 and thermocouples 612 may be connected to an infusion control system 614, and the part layup assembly 500 may be placed in a heating system 606. Heating system 606 temperatures are controlled by the infusion control system 614.

Figure 7:
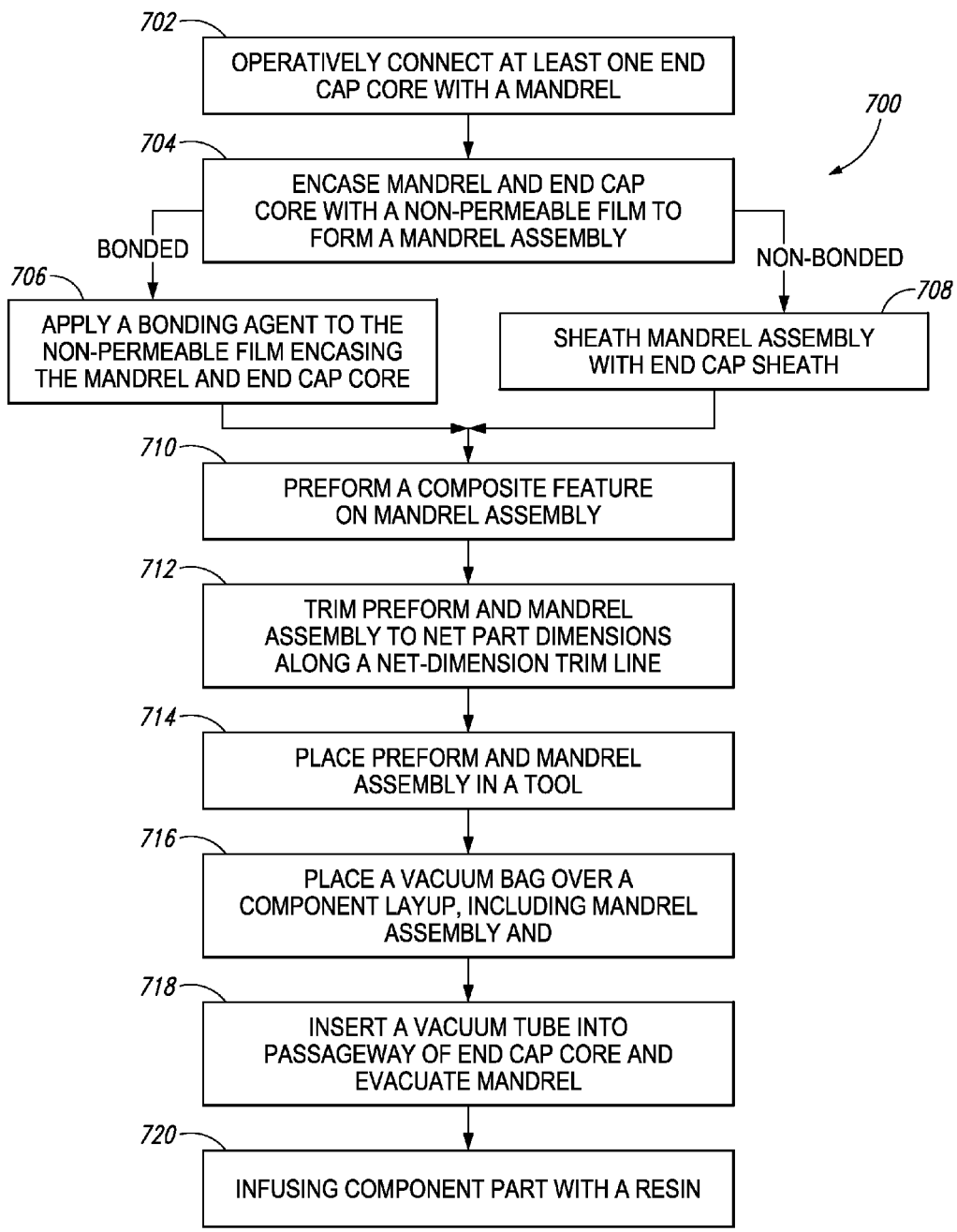
FIG. 7 illustrates a flow diagram of another embodiment of the present disclosure.

In view of the foregoing description of embodiments of the mandrel assembly 400, a number of associated methods in which the mandrel assembly 400 may be utilized will now be described. With reference to FIG. 7, a flow diagram of a bonded or non-bonded embodiment of a method for fabricating a part 700 using a mandrel assembly 400 is illustrated. The methods comprise step 702 of operatively connecting or joining an end cap core 104 with a mandrel 105. The method further comprises step 704 to encase the mandrel 105 and end cap core 104 with a non-permeable film 101 to form a mandrel assembly 400. A bonded embodiment then consists of step 706 to apply a bonding agent 112 to adhere the non-permeable film 101 to the end cap core 104. Alternatively, the non-bonded embodiment includes step 708, in which the mandrel assembly 400 is sheathed with an end cap sheath 110. Both the bonded step 706 and the non-bonded step 708 fluidly isolate the mandrel assembly 400 from resin and allow for the evacuation of the mandrel assembly 400. Following step 706 and/or 708, a structural feature, such as a stringer, is preformed on the mandrel assembly as in step 710 to create a preform 102. The preforming step involves applying a preform material, such as a carbon woven fabric, fiberglass woven fabric or unidirectional material, to a mandrel assembly 400 and heating the material under vacuum. Following a preforming step 710, in a particular implementation a trim step 712 is conducted such that the preform 102 and mandrel assembly 400 are trimmed to a net part dimension along a net-dimension trim line 103. Further to the embodiments of FIG. 7, a preform 102 and mandrel assembly 400 are placed in a tool 512 according to step 714. The component layup 510 is bagged using a bagging film 501 and evacuated as in step 716. Further, a vacuum conduit 107 may be inserted into a passageway 106 of the end cap core 104 and the mandrel system 400 may be evacuated according to step 718. Finally, in some embodiments the part 509 is infused with resin and cured as in step 720.

Figure 8:
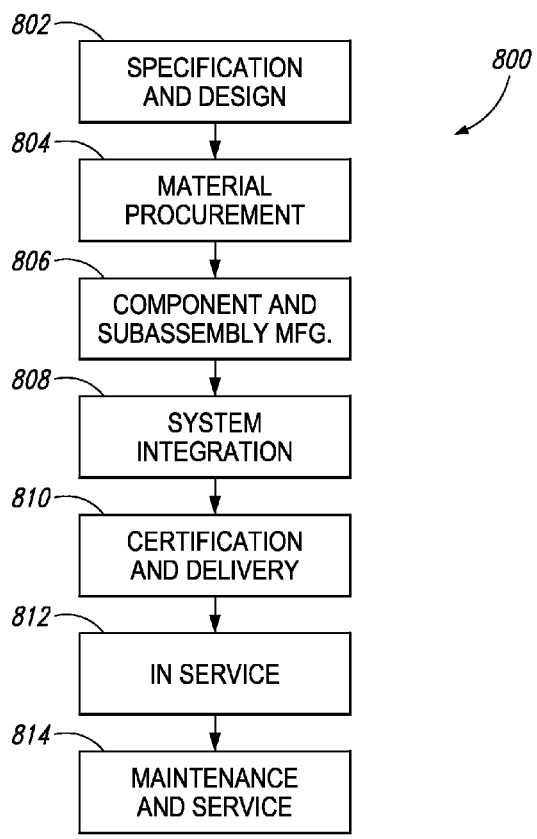
FIG. 8 illustrates a flow diagram of an aircraft production and service method according to the present disclosure.
Figure 9:
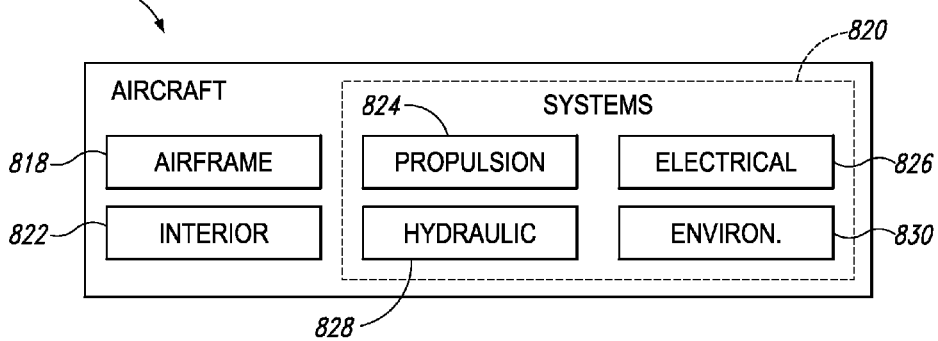
FIG. 9 is an illustration of a block diagram of an aircraft that may employ any of the embodiments disclosed herein.

Referring now to FIGS. 8 and 9, embodiments of the disclosure may be used in the context of an aircraft manufacturing and service method 800 as shown in FIG. 8 and an aircraft 816 as shown in FIG. 9. During pre-production, exemplary method 800 may include specification and design 802 of the aircraft 816 and material procurement 804. During production, component and subassembly manufacturing 806 and system integration 808 assembly of the aircraft 816 takes place. During step 806, the disclosed method and apparatus may be employed to fabricate composite parts such as fuselage sections which are then assembled at step 808. Thereafter, the aircraft 816 may go through certification and delivery 810 in order to be placed in service 812. While in service by a customer, the aircraft 816 may be scheduled for routine maintenance and service 814 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 816 produced by exemplary method 800 may include an airframe 818 with a plurality of systems 820 and an interior 822. The disclosed method and apparatus may be employed to fabricate fuselage sections which form part of the airframe 818. Examples of high-level systems 820 include one or more of a propulsion system 824, an electrical system 826, a hydraulic system 828 and an environmental system 830. Any number of other systems may be included. Although an aerospace example is shown, the principles discussed herein may be applied to other industries, such as the automotive industry.

The apparatus embodied herein may be employed during any one or more of the stages of the production and service method 800. For example, components or subassemblies corresponding to production process 806 may be fabricated or manufactured in a manner similar to components or subassemblies produced while the aircraft 816 is in service. Also, one or more apparatus embodiments may be utilized during the production stages 806 and 808, for example, by substantially expediting assembly of or reducing the cost of an aircraft. Similarly, one or more apparatus embodiments may be utilized while the aircraft 816 is in service, for example and without limitation, to maintenance and service 814.

Those skilled in the art, with judicious and prudent bearing on the preceding embodiments of the present disclosure, will understand that the embodiments provide the foundation for numerous alternatives and modifications thereto. These other modifications are also within the scope of the present disclosure. Accordingly, the present disclosure is not limited to that precisely as shown and described herein.

What is claimed is:

1. A mandrel assembly for use in manufacturing composite parts, comprising:
   a mandrel extending along a mandrel axis and including a mandrel end;
   an end cap core operatively coupled to and covering the mandrel end, the end cap core extending beyond the mandrel end along the mandrel axis; and
   a non-permeable film encasing the mandrel and the end cap core thereby to substantially seal the mandrel and the end cap core.

2. The mandrel assembly of claim 1, in which the end cap core defines a passageway extending through the end cap core to fluidly communicate with the mandrel.

3. The mandrel assembly of claim 2, in which the passageway includes an inlet configured to sealingly engage a vacuum source.

4. The mandrel assembly of claim 1, further comprising:
   at least one perimeter sealing feature formed in the end cap core; and
   an end cap sheath configured to substantially enclose the end cap core and a portion of the non-permeable film, the end cap sheath further sealingly engaging the perimeter sealing feature.

5. The mandrel assembly of claim 4, in which the end cap core defines a passageway extending through the end cap core to fluidly communicate with the mandrel.

6. The mandrel assembly of claim 1, further comprising a bonding agent disposed between the non-permeable film and the end cap core.

7. The mandrel assembly of claim 1, in which the end cap core is molded onto the mandrel.

8. The mandrel assembly of claim 1, in which the mandrel end is configured to mechanically engage the end cap core.

9. The mandrel assembly of claim 1, in which the end cap core further defines at least one trim guide attachment point configured for attachment to a trim guide tool.

10. A method of fabricating a composite part using a mandrel having a mandrel end, the method comprising:
    operatively coupling an end cap core to the mandrel end, the end cap core covering the mandrel end;
    encasing the mandrel and the end cap core with a non-permeable film;
    sealing the non-permeable film to the mandrel and the end cap core to create a mandrel assembly; and
    fabricating the composite part using the mandrel assembly.

11. The method of claim 10, in which sealing the non-permeable film includes forming at least one perimeter sealing feature in the end cap core and coupling an end cap sheath to the at least one perimeter sealing feature.

12. The method of claim 10, in which sealing the non-permeable film includes bonding the non-permeable film to the end cap core with a bonding agent.

13. The method of claim 10, in which the non-permeable film comprises a tubular non-permeable film, and in which encasing the mandrel comprises shrinking the tubular non-permeable film onto the mandrel and end cap core.

14. The method of claim 10, in which fabricating the composite part comprises:
  preforming the composite part on the mandrel assembly to obtain a preform; and
  trimming the preform and the end cap core of the mandrel assembly to a net part dimension along a net trim line.

15. The method of claim 14, in which fabricating the composite part further comprises, after trimming the preform and the end cap:
  placing the preform and mandrel assembly in a tool; and
  placing a bagging film over a component layup that includes the mandrel assembly and the preform;
  drawing the non-permeable film into intimate contact with the mandrel assembly by fluidly connecting the mandrel assembly to a vacuum source; and
  infusing the composite part with resin.

16. The method of claim 15, in which the end cap core defines a passageway in fluid communication with the mandrel and has an inlet, and in which fluidly connecting the mandrel to the vacuum source comprises coupling the vacuum source to the inlet of the passageway.

17. A mandrel assembly for use in manufacturing composite parts, comprising:
  a mandrel extending along a mandrel axis and including a mandrel end;
  an end cap core operatively coupled to and covering the mandrel end, the end cap core extending beyond the mandrel end along the mandrel axis, the end cap core defining a passageway extending through the end cap core to fluidly communicate with the mandrel and at least one trim guide attachment point configured for attachment to a trim guide tool; and
  a non-permeable film encasing the mandrel and the end cap core thereby to substantially seal the mandrel and the end cap core.

18. The mandrel assembly of claim 17, in which the passageway includes an inlet configured to sealingly engage a vacuum source.

19. The mandrel assembly of claim 17, further comprising:
  at least one perimeter sealing feature formed in the end cap core; and
  an end cap sheath configured to substantially enclose the end cap core and a portion of the non-permeable film, the end cap sheath further sealingly engaging the at least one perimeter sealing feature.

20. The mandrel assembly of claim 17, further comprising a bonding agent disposed between the non-permeable film and the end cap core.

* * * * *